US012265542B2

(12) United States Patent
Malhotra et al.

(10) Patent No.: US 12,265,542 B2
(45) Date of Patent: Apr. 1, 2025

(54) NO-CODE PLATFORM FOR GENERATING REPORTS AS A TRANSACTION

(71) Applicant: Tata Consultancy Services Limited, Mumbai (IN)

(72) Inventors: Kavita Malhotra, Gurgaon (IN); Amit Kumar Bhola, Gurgaon (IN); Purushottam Soni, New Delhi (IN); Ratikanta Pal, New Delhi (IN); Devendra Kumar Singh, Gurgaon (IN); Vaishali Asija, Gurgaon (IN); Shweta Thapliyal, Gurgaon (IN); Manoj Kumar Govel, Gurgaon (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 18/403,967

(22) Filed: Jan. 4, 2024

(65) Prior Publication Data
US 2024/0232202 A1    Jul. 11, 2024

(30) Foreign Application Priority Data
Jan. 5, 2023  (IN) .............................. 202321001224

(51) Int. Cl.
  *G06F 16/2455*   (2019.01)
  *G06F 16/2457*   (2019.01)
(52) U.S. Cl.
  CPC .. *G06F 16/24556* (2019.01); *G06F 16/24573* (2019.01)

(58) Field of Classification Search
  CPC ..................... G06F 16/24556; G06F 16/24573
  See application file for complete search history.

(56) References Cited

U.S. PATENT DOCUMENTS

| | | | |
|---|---|---|---|
| 8,990,258 B2 | 3/2015 | Bhatia | |
| 9,311,357 B2 | 4/2016 | Ramesh et al. | |
| 10,509,805 B2 | 12/2019 | Bedard et al. | |
| 10,642,990 B2 | 5/2020 | Pattabhiraman et al. | |
| 2011/0035744 A1* | 2/2011 | Bhatia ................... | G06F 16/252 717/174 |
| 2013/0013552 A1 | 1/2013 | Eshleman et al. | |
| 2015/0170382 A1 | 6/2015 | Bhatia | |

\* cited by examiner

*Primary Examiner* — Hau H Hoang
(74) *Attorney, Agent, or Firm* — FINNEGAN, HENDERSON, FARABOW, GARRETT & DUNNER LLP

(57) ABSTRACT

Generating reports from database is conventionally performed manually which requires skilled persons, time consuming and prone to errors. Thus, embodiments of present disclosure provide a no-code platform for generating reports as a transaction. User selects a slice object, its information attributes, report attributes, and optionally filters, grouping, splitting, and sorting conditions which are displayed by the no-code platform. Further, a database query is generated based on the user selection by the no code platform. The database query is then executed to retrieve data from a database. Finally, a report is generated based on the retrieved data and the report attributes. Thus, users can obtain reports as a transaction by just specifying their requirements. They need not know the complex structure of the database. Also, the method can be used to generate any type of report from any type of database irrespective of the internal data organization of the database.

6 Claims, 6 Drawing Sheets

NO-CODE PLATFORM FOR GENERATING REPORTS AS A TRANSACTION

PRIORITY CLAIM

This U.S. patent application claims priority under 35 U.S.C. § 119 to: Indian provisional application no. 202321001224, filed on Jan. 5, 2023, The entire contents of the aforementioned application are incorporated herein by reference.

TECHNICAL FIELD

The present invention generally relates to the field of information retrieval and, more particularly, to a no-code platform for generating reports as a transaction.

BACKGROUND

Enterprises store large amount of data, such as employee details, customer details, trade details, and so on, in their relational databases. The database has a complex structure with large number of interconnected tables. For various business purposes, users may want to create reports from part of the data stored in the database. For example, a HR manager may want to create report of competencies of a group of employees from time to time, an analyst may require report of transactions done with a particular customer in a particular duration of time. Generating such reports require extracting data from the databases which involves writing of database queries based on the structure of the database by skilled persons. It is time consuming and manually generated reports are prone to errors. Automated report generation tools currently available in the art also require users to prepare queries which requires them to have knowledge of information implemented in the database.

SUMMARY

Embodiments of the present disclosure present technological improvements as solutions to one or more of the above-mentioned technical problems recognized by the inventors in conventional systems. For example, in one embodiment, a method for generating reports as a transaction is provided. The method includes displaying a plurality of slice objects, one or more information attributes in each of the plurality of slice objects and one or more report attributes for user selection. The one or more report attributes comprise report type, report format, report title, and report frequency. Further, method includes receiving user selection comprising: a slice object among the plurality of slice objects, one or more information attributes of the slice object, one or more report attributes, and optionally one or more filters, grouping, splitting, and sorting conditions. The method further includes generating a database query comprising a select clause, a from clause, and optionally a where clause, a join condition, a group by clause and an order by clause. Generating the data base query based on the user selection comprises: (i) creating the select clause comprising one or more database field names identified from the information attributes of the slice object using a metadata related to the slice object, (ii) creating the from clause comprising one or more database table names identified using the metadata related to the slice object, (iii) creating the where clause based on the one or more filters, (iv) creating the join condition if the one or more database field names belong to more than one database tables as specified in the metadata related to the slice object, (v) creating the group by clause from the grouping conditions and the splitting conditions, and (vi) creating the order by clause from the sorting conditions. Furthermore, the method includes executing the database query to retrieve data from a database and generating a report based on the retrieved data and the one or more report attributes.

In another aspect, a system for generating reports as a transaction is provided. The system includes: a memory storing instructions; one or more communication interfaces; and one or more hardware processors coupled to the memory via the one or more communication interfaces, wherein the one or more hardware processors are configured by the instructions to display a plurality of slice objects, one or more information attributes in each of the plurality of slice objects and one or more report attributes for user selection. The one or more report attributes comprise report type, report format, report title, and report frequency. Further, the one or more hardware processors are configured to receive user selection comprising: a slice object among the plurality of slice objects, one or more information attributes of the slice object, one or more report attributes, and optionally one or more filters, grouping, splitting, and sorting conditions. The one or more hardware processors are further configured to generate a database query comprising a select clause, a from clause, and optionally a where clause, a join condition, a group by clause and an order by clause. Generating the data base query based on the user selection comprises: (i) creating the select clause comprising one or more database field names identified from the information attributes of the slice object using a metadata related to the slice object, (ii) creating the from clause comprising one or more database table names identified using the metadata related to the slice object, (iii) creating the where clause based on the one or more filters, (iv) creating the join condition if the one or more database field names belong to more than one database tables as specified in the metadata related to the slice object, (v) creating the group by clause from the grouping conditions and the splitting conditions, and (vi) creating the order by clause from the sorting conditions. Furthermore, the one or more hardware processors are configured to execute the database query to retrieve data from a database and generate a report based on the retrieved data and the one or more report attributes.

In yet another aspect, there are provided one or more non-transitory machine-readable information storage mediums comprising one or more instructions which when executed by one or more hardware processors cause a method for generating reports as a transaction is provided. The method includes displaying a plurality of slice objects, one or more information attributes in each of the plurality of slice objects and one or more report attributes for user selection. The one or more report attributes comprise report type, report format, report title, and report frequency. Further, method includes receiving user selection comprising: a slice object among the plurality of slice objects, one or more information attributes of the slice object, one or more report attributes, and optionally one or more filters, grouping, splitting, and sorting conditions. The method further includes generating a database query comprising a select clause, a from clause, and optionally a where clause, a join condition, a group by clause and an order by clause. Generating the data base query based on the user selection comprises: (i) creating the select clause comprising one or more database field names identified from the information attributes of the slice object using a metadata related to the slice object, (ii) creating the from clause comprising one or more database table names identified using the metadata related to the slice object, (iii) creating the where clause based on the one or more filters, (iv) creating the join condition if the one or more database field names belong to more than one database tables as specified in the metadata related to the slice object, (v) creating the group by clause from the grouping conditions and the splitting conditions, and (vi) creating the order by clause from the sorting conditions. Furthermore, the method includes executing the database query to retrieve data from a database and generating a report based on the retrieved data and the one or more report attributes.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
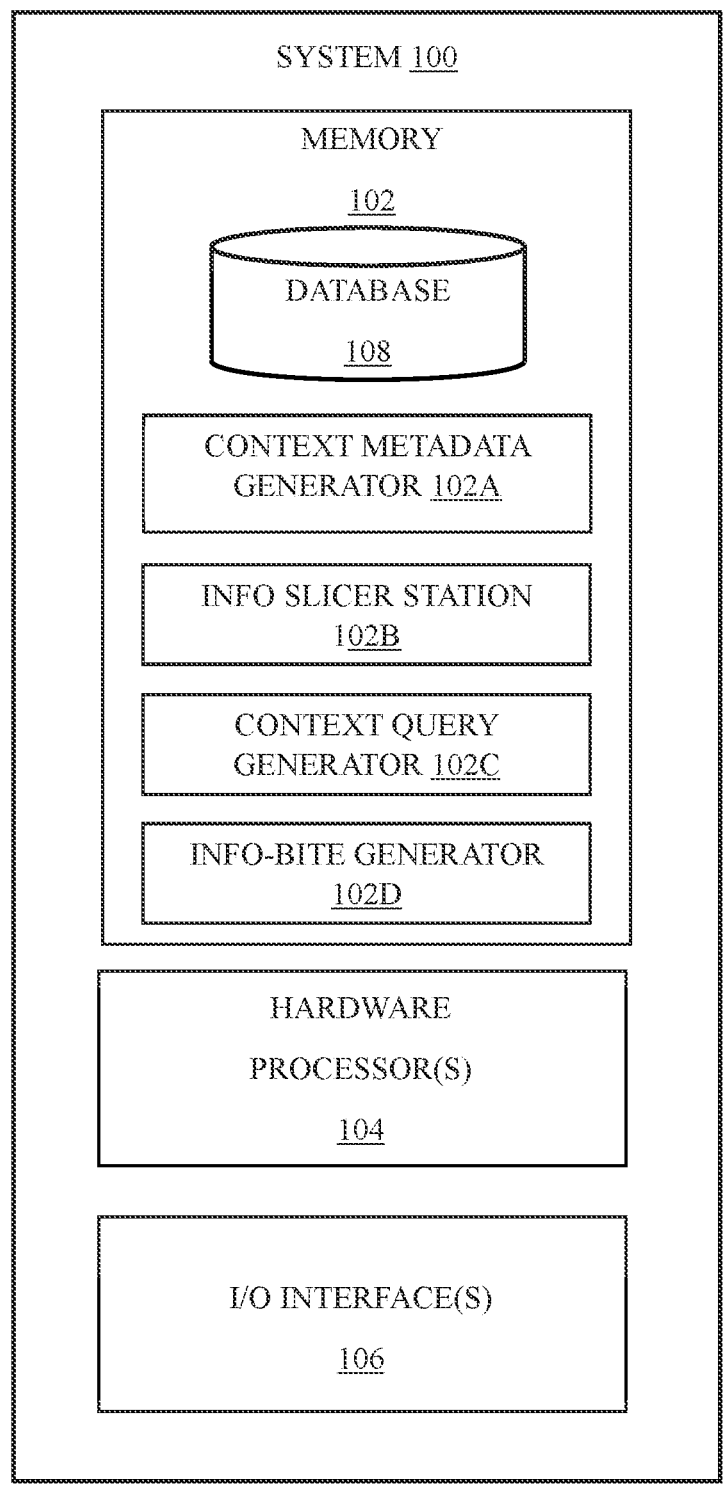
FIG. 1 illustrates an exemplary block diagram of a system for generating reports as a transaction using a no-code platform, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Generating reports from database is usually performed manually which requires skilled persons. It is time consuming and prone to errors. To overcome the drawbacks of conventional methods, embodiments of present disclosure provide a no-code platform for generating reports as a transaction. Initially, slice objects, information attributes in each of the slice objects and report attributes are displayed to a user by the no-code platform. The user selects a slice object, information attributes of the slice object, report attributes, and optionally filters, grouping, splitting, and sorting conditions. The user selection is received by the no code platform. Further, a database query is generated based on the user selection. The database query is executed to retrieve data from a database. Finally, a report is generated based on the retrieved data and the report attributes. Thus, users can obtain reports as a transaction by just specifying their requirements. They need not know the complex structure of the database. Also, the method can be used to generate any type of report from any type of database irrespective of the internal data organization of the database.

Referring now to the drawings, and more particularly to FIGS. 1 to 4 where similar reference characters denote corresponding features consistently throughout the figures, there are shown preferred embodiments and these embodiments are described in the context of the following exemplary system and/or method.

FIG. 1 illustrates an exemplary block diagram of a system 100 for generating reports as a transaction using the no-code platform, according to some embodiments of the present disclosure. In an embodiment, the system 100 includes one or more processors 104, communication interface device(s) 106 or Input/Output (I/O) interface(s) 106 or user interface 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 comprises a database 108, a metadata generator 102A, an info slicer station 102B, a context query generator 102C, and an info-bite generator 102D.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) 106 is coupled with the info slicer station 102B which displays slice objects, information attributes in each of the slice objects and report attributes for user selection. Further, the info slicer station 102B receives the user selection. The user selection provides the info slicer station 102B with a slice object, information attributes of the slice object, report attributes, and optionally filters, grouping, splitting, and sorting conditions. The info slicer station 102B also displays the report generated by the info-bite generator 102D and allow user to download the report.

Figure 2A:
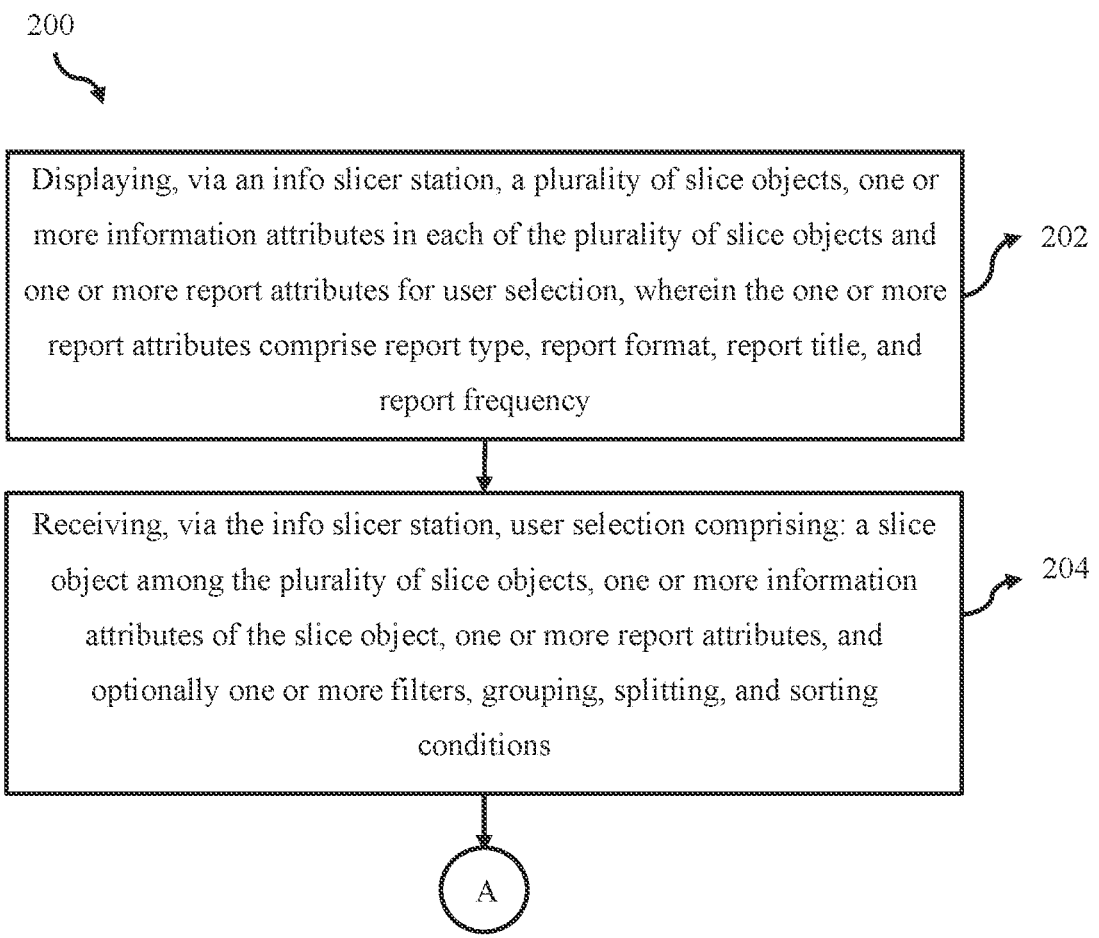
FIGS. 2A, 2B and 2C, collectively referred as FIG. 2, are flow diagrams illustrating a method for generating reports as a transaction using the no-code platform, according to some embodiments of the present disclosure.
Figure 2B:
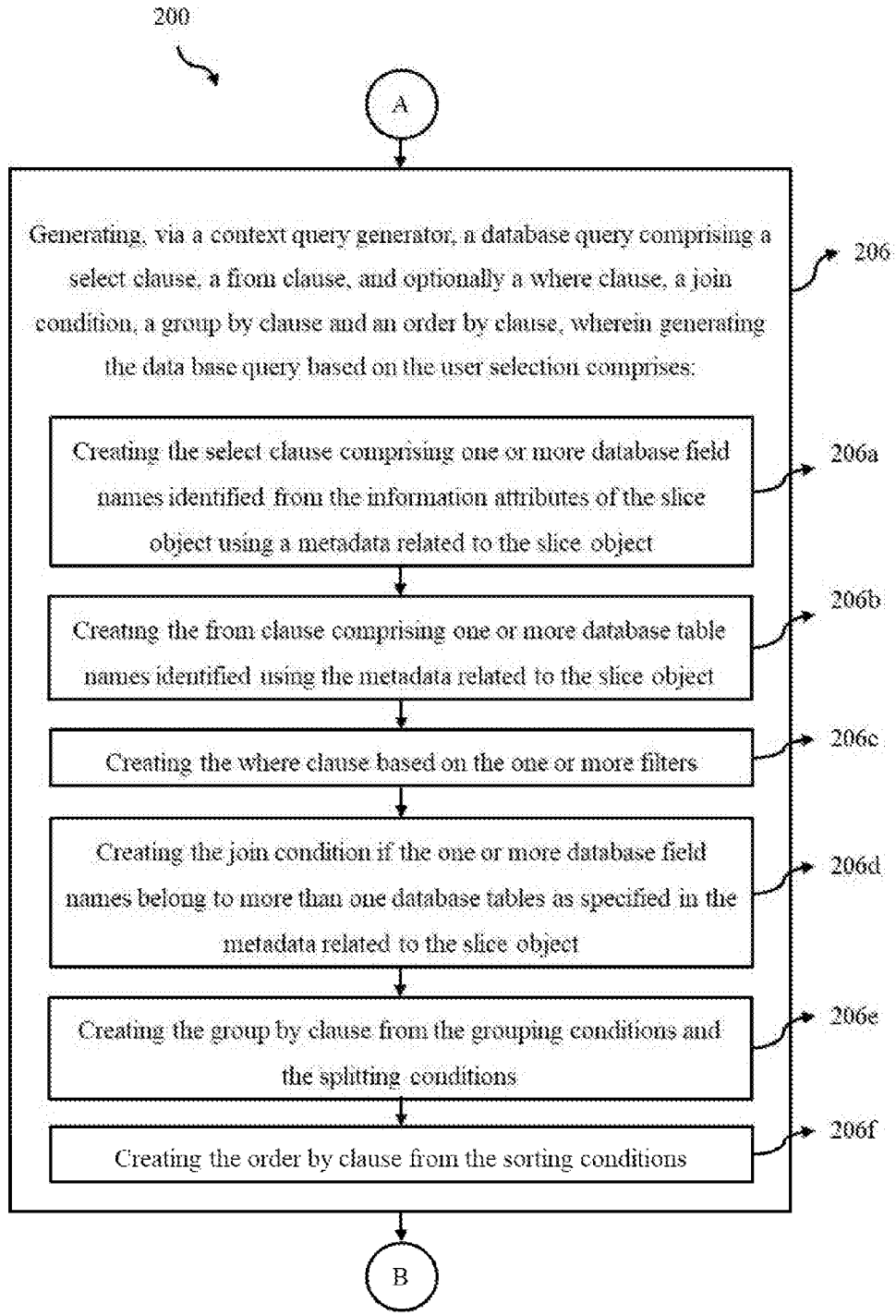
Figure 2C:
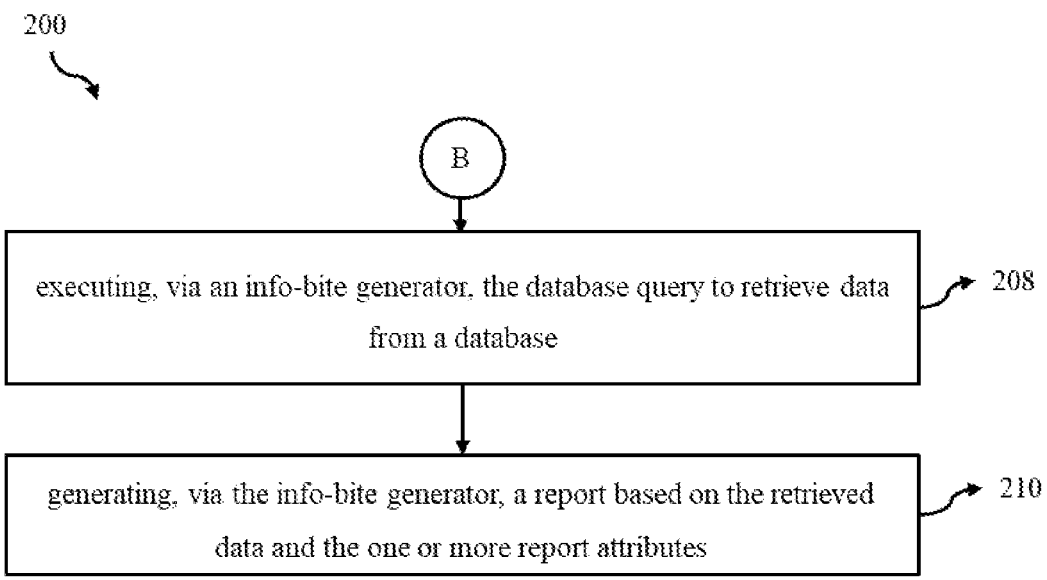
Figure 3:
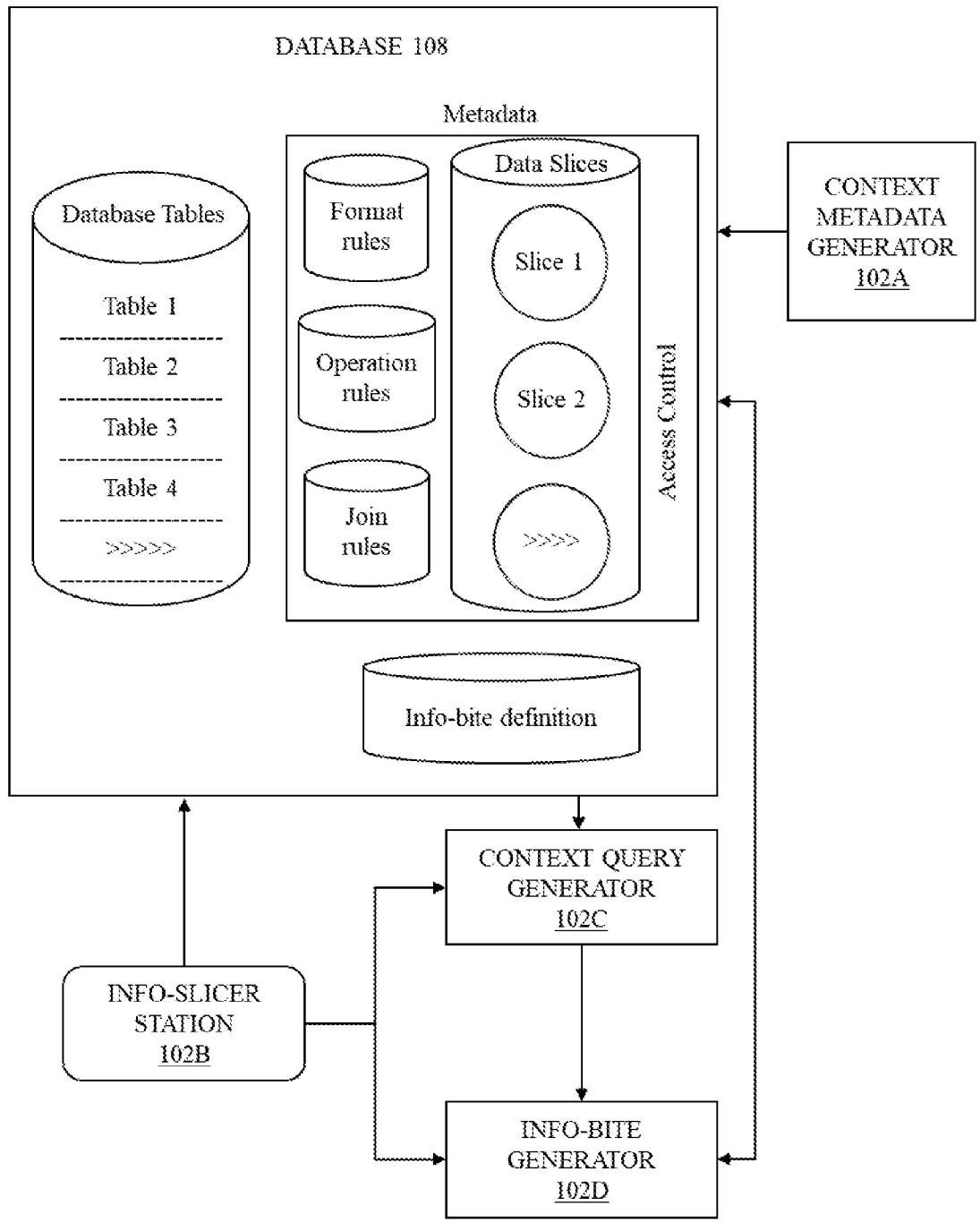
FIG. 3 illustrates an exemplary block diagram of the no-code platform used by the system of FIG. 1 for generating reports as a transaction, according to some embodiments of the present disclosure.
Figure 4:
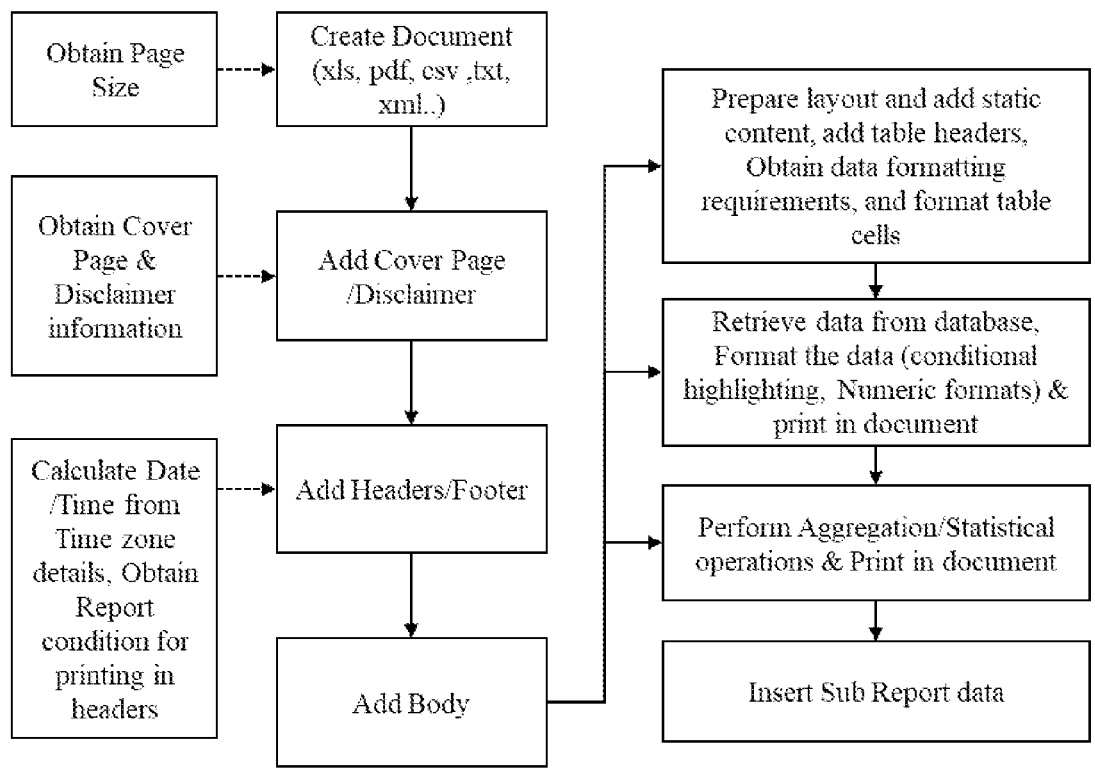
FIG. 4 is a flow diagram illustrating process of generating reports by info-bite generator component within the no-code platform, according to some embodiments of the present disclosure.

Functions of the components of system 100 are explained in conjunction with flow diagram depicted in FIGS. 2 and 4, and block diagram illustrated in FIG. 3 for generating reports as a transaction. In an embodiment, the system 100 comprises one or more data storage devices or the memory 102 operatively coupled to the processor(s) 104 and is configured to store instructions for execution of steps of the method (200) depicted in FIG. 2 by the processor(s) or one or more hardware processors 104. The steps of the method of the present disclosure will now be explained with reference to the components or blocks of the system 100 as depicted in FIG. 1, the steps of flow diagram as depicted in FIGS. 2 and 4, and the block diagram of FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Before execution of method 200 illustrated in FIG. 2, metadata is generated offline using a context metadata generator 102A. The metadata is a simplified representation of database that is generated for each of a plurality of slice objects. Each slice object is a flat functional view of the logically grouped fields across various database tables in a parent-child relationship with linkages to reference database tables. Metadata is generated based on: (i) rules for transformation of database fields, (ii) metadata mapping to database fields in direct and transformed view, (iii) definition of join conditions for permutations and combinations of database fields in each of the plurality of slice objects, and (iv) business context of the database fields. Metadata generation is a one-time process performed while configuring the no-code platform for generating reports as a transaction. Metadata is designed comprehensively to enable capture of user requirements through I/O interface by exposing elements of slice objects, building of queries dynamically, generation of formatted outputs, flexibility of switching on and switching off select data, and dividing a slice object into multiple slices for presentation either for the purpose of user friendliness or access control.

FIG. 2 is a flow diagram illustrating method 200 for generating reports as a transaction using the no-code platform, according to some embodiments of the present disclosure. At step 202 of the method 200, the one or more hardware processors 104 are configured to display, via the info slicer station 102B, the plurality of slice objects, one or more information attributes in each of the plurality of slice objects and one or more report attributes for user selection. The one or more report attributes comprise report type, report format, report title, and report frequency. Further, at step 204 of the method 200, user selection which provides the slice object among the plurality of slice objects, one or more information attributes of the slice object, one or more report attributes, and optionally one or more filters, grouping, splitting, and sorting conditions, are received via the info slicer station 102B.

Once the user selection is received, at step 206 of the method 200, a database query is generated based on the user selection by steps 206a to 206f via the context query generator 102C. The database query comprises a select clause, a from clause, and optionally a where clause, a join condition, a group by clause and an order by clause. Even though the steps 206a-206f are represented sequentially in FIG. 2, in another embodiment they may be performed in parallel. At step 206a, the select clause comprising one or more database field names identified from the information attributes of the slice object is created using the metadata related to the slice object. At step 206b, the from clause comprising one or more database table names identified using the metadata related to the slice object is created. At step 206c, the where clause is created based on the one or more filters. At step 206d, the join condition is created if the one or more database field names belong to more than one database tables as specified in the metadata related to the slice object. The join condition is selected from a plurality of pre-defined join conditions in the metadata based on a weightage calculated for each of the plurality of join conditions according to equation 1.

$$\text{(number of columns matched as a foreign key between a main table and a join table in the join condition)}^2 + \text{pre-defined weightage of the main table} + \text{pre-defined weightage of the join table} + \text{(number of columns matched when there is no direct foreign key between the main table and the join table} + 1)^3 + \text{unique ID of the slice object} + 1 \text{ if the main table and the join table belong to a same data group within the slice object or 0 if the main table and the join table belong to different data groups within the slice object} \quad (1)$$

The pre-defined join conditions are one of inner join conditions and outer join conditions. Table 1 illustrates the way in which inner join and outer join conditions, respectively, are stored in the metadata.

TABLE 1

| Attribute Name | Primary Key | Attribute Data Type | Nullable | Remarks |
| --- | --- | --- | --- | --- |
| TABLE_ID | Yes | NUMBER (4) | No | TABLE_ID number |
| MAIN_TABLE | Yes | VARCHAR (50) | No | Table name of main table |
| JOIN_TABLE | Yes | VARCHAR (50) | No | Join table name |
| DATA_GROUP | No | VARCHAR (100) | No | Grouping of tables based on their original data grouping |
| JOIN_CLAUSE | No | VARCHAR2 (4000) | No | Join condition between the two table |
| WEIGHTAGE | No | NUMBER (4) | No | Weightage calculated for join clause using equation 1 |
| PARENT (for inner join)/ PARENT_JOIN (for outer join) | No | VARCHAR (50)/ VARCHAR2 (4000) | Yes | PARENT field stores parent table name of the data |

TABLE 1-continued

| Attribute Name | Primary Key | Attribute Data Type | Nullable | Remarks |
| --- | --- | --- | --- | --- |
| | | | | group. PARENT_JOIN stores the join through the parent of data group |
| SKIP_SPL | No | VARCHAR (3) | No | Special Flag to check whether tables should be joined directly or should it go through the parent |
| SERIAL | No | NUMBER (6) | No | Serial number |
| STATIC_WEIGHT | No | NUMBER (2) | No | Pre-defined weightage of main table |

At step 206e, the group by clause is created from the grouping conditions and the splitting conditions. At step 206f, the order by clause is created from the sorting conditions. As understood by a person skilled in the art, the select clause, the from clause, the where clause, the join condition, the group by clause and the order by clause together forms the database query. Once the database query is generated, then at step 208 of the method 200, the database query is executed via the info-bite generator 102D to retrieve data from the database 108. Further, at step 210 of the method 200, a report is generated based on the retrieved data and the one or more report attributes (received from user at step 204) by the info-bite generator 102D.

The steps of the process of generating reports by info-bite generator 102D within the no-code platform is illustrated in flow diagram of FIG. 4. Initially a blank document of the report format specified by the user is created. The report format can be one of Portable Document Format (PDF), Microsoft Excel, Comma Separated Value (CSV), text (txt), Extensible Markup Language (XML) and the like. In an embodiment, iText API is used for generating PDF document, POI API is used for generating Microsoft Excel document and java libraries are used for other formats. Then, a cover page comprising report title, disclaimer information, header and footer are added to the blank document based on user requirement. The header and footer may include date, time, enterprise name and the like. Finally main body of the report is added based on the retrieved data. In the main body, the info-slicer station prepares the layout, table headers, field formats and performs required aggregation as well as statistical operations. The final report is stored in a designated place and emailed as per rules, if so specified. For security purpose the report can be Zipped, and password protected before emailing.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
   displaying, via an info slicer station implemented by one or more hardware processors, a plurality of slice objects, one or more information attributes in each of the plurality of slice objects and one or more report attributes for user selection, wherein the one or more report attributes comprise report type, report format, report title, and report frequency;
   receiving, via the info slicer station, user selection comprising: a slice object among the plurality of slice objects, one or more information attributes of the slice object, one or more report attributes, and optionally one or more filters, grouping, splitting, and sorting conditions;
   generating, via a context query generator implemented by the one or more hardware processors, a database query comprising a select clause, a from clause, and optionally a where clause, a join condition, a group by clause and an order by clause, wherein generating the data base query based on the user selection comprises:
      creating the select clause comprising one or more database field names identified from the information attributes of the slice object using a metadata related to the slice object, wherein the metadata is a simplified representation of database that is generated for each of the plurality of slice objects by a metadata generator, implemented by the one or more hardware processors, based on (i) rules for transformation of database fields, (ii) metadata mapping to database fields in direct and transformed view, (iii) definition of join conditions for permutations and combinations of database fields in each of the plurality of slice objects, and (iv) business context of the database fields;
      creating the from clause comprising one or more database table names identified using the metadata related to the slice object;
      creating the where clause based on the one or more filters;
      creating the join condition if the one or more database field names belong to more than one database tables as specified in the metadata related to the slice object;
      creating the group by clause from the grouping conditions and the splitting conditions; and
      creating the order by clause from the sorting conditions;
   executing, via an info-bite generator implemented by the one or more hardware processors, the database query to retrieve data from a database; and
   generating, via the info-bite generator, a report based on the retrieved data and the one or more report attributes.

2. The method of claim 1, wherein the join condition is selected from a plurality of pre-defined join conditions in the metadata based on a weightage calculated for each of the plurality of join conditions as: ((number of columns matched as a foreign key between a main table and a join table in the join condition)$^2$+pre-defined weightage of the main table+pre-defined weightage of the join table+(number of columns matched when there is no direct foreign key between the main table and the join table+1)$^3$+unique ID of the slice object+1 if the main table and the join table belong to a same data group within the slice object or 0 if the main table and the join table belong to different data groups within the slice object).

3. A system, comprising:
   a memory storing instructions;
   one or more communication interfaces; and
   one or more hardware processors coupled to the memory via the one or more communication interfaces, wherein the one or more hardware processors are configured by the instructions to:
      display, via an info slicer station, a plurality of slice objects, one or more information attributes in each of the plurality of slice objects and one or more report attributes for user selection, wherein the one or more report attributes comprise report type, report format, report title, and report frequency;
      receive, via the info slicer station, user selection comprising: a slice object among the plurality of slice objects, one or more information attributes of the slice object, one or more report attributes, and optionally one or more filters, grouping, splitting, and sorting conditions;
      generate, via a context query generator, a database query comprising a select clause, a from clause, and optionally a where clause, a join condition, a group by clause and an order by clause, wherein generating the data base query based on the user selection comprises:
         creating the select clause comprising one or more database field names identified from the information attributes of the slice object using a metadata related to the slice object, wherein the metadata is a simplified representation of database that is generated for each of the plurality of slice objects by a metadata generator, implemented by the one or more hardware processors, based on (i) rules for transformation of database fields, (ii) metadata mapping to database fields in direct and transformed view, (iii) definition of join conditions for permutations and combinations of database fields in each of the plurality of slice objects, and (iv) business context of the database fields;
         creating the from clause comprising one or more database table names identified using the metadata related to the slice object;

creating the where clause based on the one or more filters;

creating the join condition if the one or more database field names belong to more than one database tables as specified in the metadata related to the slice object;

creating the group by clause from the grouping conditions and the splitting conditions; and creating the order by clause from the sorting conditions;

execute, via an info-bite generator, the database query to retrieve data from a database; and generate, via the info-bite generator, a report based on the retrieved data and the one or more report attributes.

4. The system of claim 3, wherein the join condition is selected from a plurality of pre-defined join conditions in the metadata based on a weightage calculated for each of the plurality of join conditions as: ((number of columns matched as a foreign key between a main table and a join table in the join condition)$^2$+pre-defined weightage of the main table+pre-defined weightage of the join table+(number of columns matched when there is no direct foreign key between the main table and the join table+1)$^3$+unique ID of the slice object+1 if the main table and the join table belong to a same data group within the slice object or 0 if the main table and the join table belong to different data groups within the slice object).

5. One or more non-transitory machine-readable information storage mediums comprising one or more instructions which when executed by one or more hardware processors cause:

displaying, via an info slicer station, a plurality of slice objects, one or more information attributes in each of the plurality of slice objects and one or more report attributes for user selection, wherein the one or more report attributes comprise report type, report format, report title, and report frequency;

receiving, via the info slicer station, user selection comprising: a slice object among the plurality of slice objects, one or more information attributes of the slice object, one or more report attributes, and optionally one or more filters, grouping, splitting, and sorting conditions;

generating, via a context query generator, a database query comprising a select clause, a from clause, and optionally a where clause, a join condition, a group by clause and an order by clause, wherein generating the data base query based on the user selection comprises:

creating the select clause comprising one or more database field names identified from the information attributes of the slice object using a metadata related to the slice object, wherein the metadata is a simplified representation of database that is generated for each of the plurality of slice objects by a metadata generator, implemented by the one or more hardware processors, based on (i) rules for transformation of database fields, (ii) metadata mapping to database fields in direct and transformed view, (iii) definition of join conditions for permutations and combinations of database fields in each of the plurality of slice objects, and (iv) business context of the database fields;

creating the from clause comprising one or more database table names identified using the metadata related to the slice object;

creating the where clause based on the one or more filters;

creating the join condition if the one or more database field names belong to more than one database tables as specified in the metadata related to the slice object;

creating the group by clause from the grouping conditions and the splitting conditions; and creating the order by clause from the sorting conditions;

executing, via an info-bite generator, the database query to retrieve data from a database; and generating, via the info-bite generator, a report based on the retrieved data and the one or more report attributes.

6. The one or more non-transitory machine-readable information storage mediums of claim 5, wherein the join condition is selected from a plurality of pre-defined join conditions in the metadata based on a weightage calculated for each of the plurality of join conditions as: ((number of columns matched as a foreign key between a main table and a join table in the join condition)$^2$+pre-defined weightage of the main table+pre-defined weightage of the join table+(number of columns matched when there is no direct foreign key between the main table and the join table+1)$^3$+unique ID of the slice object+1 if the main table and the join table belong to a same data group within the slice object or 0 if the main table and the join table belong to different data groups within the slice object).

* * * * *